June 15, 1926.
P. L. SCOTT
1,589,243
PROCESS OF MANUFACTURING AND FITTING VALVE DISKS
Original Filed Sept. 17, 1921
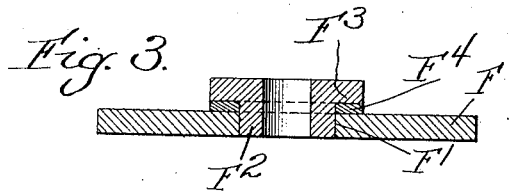
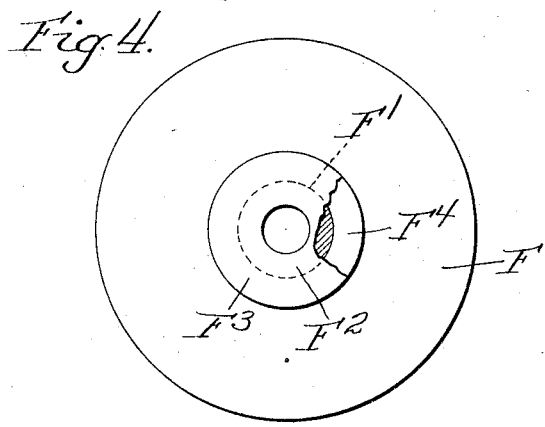
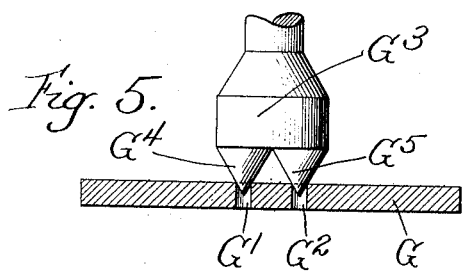
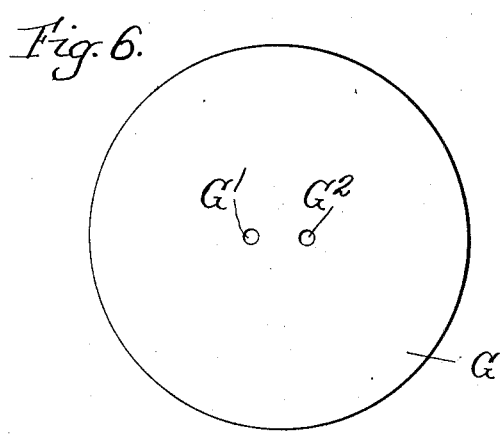
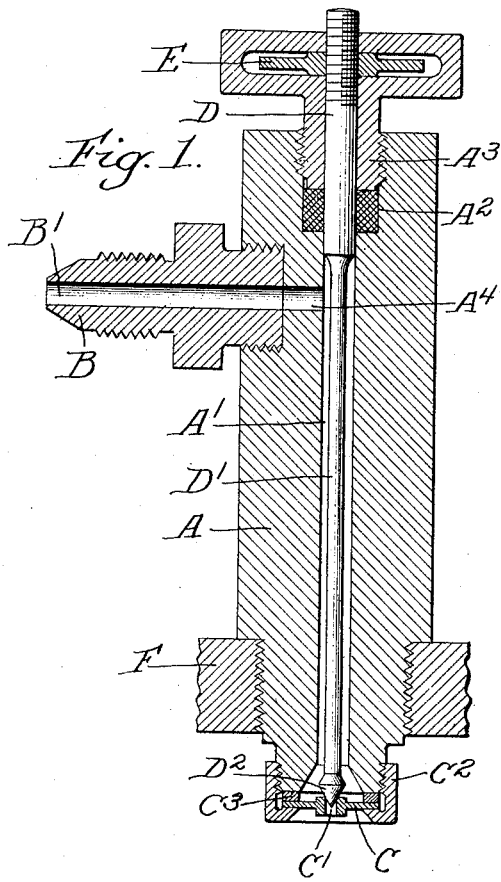
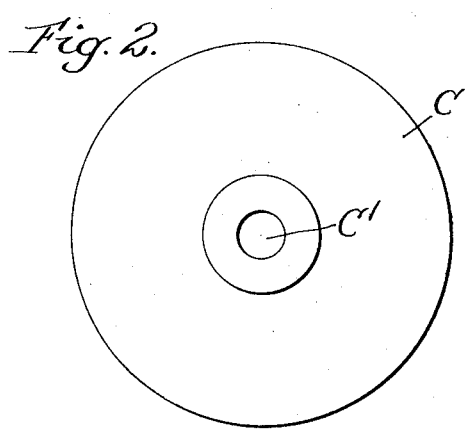
Witness
Edward T. Wray.
Inventor
Philip L. Scott
by Parker & Carter
Attorneys Patented June 15, 1926.

1,589,243

UNITED STATES PATENT OFFICE.

PHILIP LANE SCOTT, OF CHICAGO, ILLINOIS, ASSIGNOR TO SUPER-DIESEL TRACTOR CORPORATION, OF LA PORTE, INDIANA, A CORPORATION OF NEW YORK.

PROCESS OF MANUFACTURING AND FITTING VALVE DISKS.

Application filed September 17, 1921, Serial No. 501,500. Renewed January 6, 1926.

My invention relates to the process of manufacturing and fitting valve disks for injection valves and the like, and applies particularly to valves adapted to be used for the direct injection of liquid fuel in internal combustion engines.

In one form of valve adapted for use in this connection, I have found it advisable to use a disk adapted to be distorted by the pressure of the fuel against it. In this disk I provide one or more holes of circular or other shape and I provide also points to fit into and close these holes, except when the pressure of the fuel is such as to alter the shape of the disk and move it away from the point. It is the process of making and fitting these disks and the points which fit into them that forms the subject matter of this application.

One form of my invention is illustrated in the accompanying drawings, wherein—

Figure 1 is a vertical section of one form of my device;

Fig. 2 is a plan view of the valve disk;

Fig. 3 is a vertical section through a modified form of the device;

Fig. 4 is a plan view thereof;

Fig. 5 is a vertical section through a further modification;

Fig. 6 is a plan view thereof.

Like parts are indicated by like characters in all the figures.

A is the body of the injection valve having the central bore $A'$ enlarged at its upper end as at $A^2$. $A^3$ is a threaded supporting plug inserted in the enlarged portion $A^2$. $A^4$ is a bore connecting with the central bore $A^1$ and with the bore $B^1$ of the screw threaded plug B which is adapted to be connected with the fuel supply.

C is a perforated valve disk secured to the end of the valve body A by the cap $C^2$ and spaced slightly away from it by the gasket $C^3$. $C^1$ is a perforation in the disk. D is the valve rod threaded at its upper end and reduced throughout the greater part of its length as at $D^1$. It carries the enlarged needle point $D^2$ adapted to penetrate and to fill the perforation $C'$ of the valve disk C.

E is an adjusting and supporting member by means of which the valve rod D is supported in position and adjustable with relation to the valve disk.

In the modified form shown in Figs. 3 and 4, F is a spring disk. It is apertured at $F^1$. $F^2$ is a hollow plug contained within the aperture flanged at $F^3$. $F^4$ is a packing washer between the flange and the disk to prevent leakage. The needle point penetrates the aperture in the plug and closes it.

In the modified form shown in Figs. 5 and 6, G is a spring disk. It is perforated at $G^1$, $G^2$. The valve member $G^3$ has two needle points $G^4$, $G^5$, penetrating respectively the apertures $G^1$ and $G^2$.

Although I have illustrated herewith three forms of valve by means of which my process may be successfully carried out, it will be obvious that many other forms might function in the same novel manner, and I, therefore, do not wish to be limited to the present forms.

It will be understood, of course, that these valve assemblies are used for spray valves where a very minute quantity of the liquid fuel is sprayed into an engine cylinder at very high pressure, and the characteristic of the device is that the stiff spring valve disk does not give very far under pressure and must immediately reseat, as soon as the pressure is released, and must so re-seat itself as to prevent drooling when the valve is closed. The zone of contact between the disk and the needle valve is a very narrow one and therefore, a perfect fit between the disk and the needle is absolutely essential. This cannot be obtained by machining the parts. They can be made to fit fairly close by machining processes, but the only way to get a satisfactory fit is to actually cause one to shape the other and it is this which is done when I distort the disk by pressure of the needle valve and hold the parts together until the needle and the disk mate one upon the other to form a proper seat as a result of pressure and wear. This wearing process is very rapid at first, when the edge of the hole is sharp, but soon is reduced to negligible amount permitting long operation, as the worn seat becomes wider. It will be seen that by this method, the seat is just as narrow as the factor of wear in operation will permit it to be, and it is desirable to have as narrow a seat as possible to reduce frictional losses.

The process of making and fitting the disks is as follows:

The disk is made from hard spring metal such, for instance, as saw steel and in it a small hole is punched or drilled. This is then placed in position in a valve casing and secured therein by a holding cap. A needle point approximately fitting the hole in the disk is then placed within the central bore of the valve body and in register with the hole in the disk. The valve rod is then depressed and the needle point is forced into the hole in the disk and pressed therein. The shape of the disk is somewhat altered by this pressure, and the hole in the disk and the needle point engaging together thus tend to conform to each other and, after a short period of operation to mate accurately, so that in the future use of the valve, the needle when positioned within the hole in the disk will completely fill it and will prevent any leakage of fuel except in the present of sufficient pressure to move the disk bodily away from it. For certain purposes this general process may be shortened somewhat by initiating the shaping of the valve seat about the orifice in the following manner: Before the valve is assembled a tool similar in size and shape to the needle of the valve is inserted in the same relative manner as the needle and sufficient pressure is applied partly to form a seat about the injection orifice initiating action of the needle and preparatory to completing the process by the needle and the obtaining of an extremely accurate fit after the valve is assembled.

The use and operation of the form of valve illustrated herewith, is as follows:

In the several forms of my valve, the fuel is supplied to the central bore of the valve body under high pressure and it is then conducted to the point of valve opening. In the form shown in Fig. 1, the passage of fuel through the hole in the valve disk is normally completely prevented by the presence in that hole of the needle point. When the pressure of the fuel becomes such as actually to distort and bend the edges of the valve disk away from the needle point, sufficient clearance is provided to allow the passage of the fuel, and it will be injected through this clearance in a finely atomized form.

In a modified form the spring disk carries an apertured plug in which the seat is formed. The operation of forming the seat by forcing the needle valve against it is exactly the same is if the seat were on the disk itself.

In the further modified form, where two apertures are used and a double needle point, the same thing takes place. Each needle point penetrates its own hole and makes its own seat in or about that hole, and in every case, the pressure exerted by the liquid fuel upon the spring disk has the same operation, that is, tends to deflect the spring and open a minute passage or aperture between the seat and the needle point through which discharge of the liquid may take place.

When this process is carried out and the valve housing with the disk and needle are brought together and put in an engine, their operation at first will not be perfectly satisfactory, but as time goes on conditions of operation will improve as the valve seat is worn by the movement of the disk, and perhaps by the discharge of the liquid, until, after a comparatively short delay the needle valve will have worn or formed a proper seat on the disk. After that has been done the operation of the spring valve will be perfectly satisfactory, because the needle valve and valve disk will have worn or formed or shaped a proper seat for the needle on the valve.

I claim:

1. The process of making and fitting a valve seat in an atomizing valve assembly which consists in placing in working relation the member forming the valve seat and bounding the atomizing orifice and the member adapted to be seated in said seat and forcing and working them together to shape and form the valve seat and until they fit exactly.

2. The process of making and fitting a valve seat in an atomizing valve assembly which consists in placing in working relation the member forming the valve seat and bounding the atomizing orifice and the member adapted to be seated in said seat and forcing and working them together to shape and form the valve seat and in the operation of the valve until they fit exactly.

3. The process of making and fitting a valve seat in an atomizing valve assembly which consists in placing in working relation the member forming the valve seat and bounding the atomizing orifice and the member adapted to be seated in said seat and forcing and working them together to shape and form the valve seat and under normal operating conditions until they fit exactly.

4. The process of fitting the parts of an injection valve together which consists in placing the perforated valve disk in place and rigidly supporting it about its periphery, then inserting a needle valve loosely into engagement with the perforation in the disk, and then forcing the needle valve against the disk and exerting a sufficient pressure there against to distort the disk and shape the edges of the perforations in strict conformation with the contour of the needle valve.

5. The process of making and fitting a valve disk to a fuel injection valve which consists in making a disk, perforating it, placing it in the valve, positioning a needle point in it in register with said perforation and forcing the two together to shape and form the valve seat and until they fit exactly.

6. The process of making and fitting a valve disk to a fuel injection valve which consists in making a disk, perforating it, placing it in the valve, positioning a needle point in it in register with said perforation and forcing the two together, and operating the injection valve until the parts have worked themselves together to form a satisfactory seat.

7. The process of making and fitting a valve disk to a fuel injection valve which consists in making a disk, perforating it and partially forming a valve seat about said perforation, placing the disk in the valve, positioning a needle point in it in register with said perforation and forcing the two together to shape and form the valve seat and until they fit exactly.

Signed at Chicago county of Cook and State of Illinois, this 14th day of September, 1921.

PHILIP LANE SCOTT.